United States Patent
Wang et al.

(10) Patent No.: US 12,393,692 B2
(45) Date of Patent: Aug. 19, 2025

(54) TRUSTED AUTHENTICATION SYSTEM, METHOD, MAINBOARD, MICRO BOARD, AND STORAGE MEDIUM

(71) Applicant: ALIBABA GROUP HOLDING LIMITED, Grand Cayman (KY)

(72) Inventors: Hui Wang, Hangzhou (CN); Zhichao Li, Hangzhou (CN); Jicheng Chen, Hangzhou (CN); Zilong Huang, Hangzhou (CN); Tao Lyu, Hangzhou (CN); Fang Liu, Hangzhou (CN); Zhiqian Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 213 days.

(21) Appl. No.: 18/026,582

(22) PCT Filed: Sep. 9, 2021

(86) PCT No.: PCT/CN2021/117387
§ 371 (c)(1),
(2) Date: Mar. 15, 2023

(87) PCT Pub. No.: WO2022/057720
PCT Pub. Date: Mar. 24, 2022

(65) Prior Publication Data
US 2024/0028738 A1 Jan. 25, 2024

(30) Foreign Application Priority Data
Sep. 16, 2020 (CN) .......................... 202010982939.8

(51) Int. Cl.
*G06F 21/57* (2013.01)
*G06F 21/85* (2013.01)

(52) U.S. Cl.
CPC .......... *G06F 21/575* (2013.01); *G06F 21/572* (2013.01); *G06F 21/85* (2013.01)

(58) Field of Classification Search
CPC ...... G06F 21/57; G06F 21/572; G06F 21/575; G06F 21/85
See application file for complete search history.

(56) References Cited

U.S. PATENT DOCUMENTS

| | | | |
|---|---|---|---|
| 2006/0224878 A1 | 10/2006 | Datta et al. | |
| 2010/0235648 A1* | 9/2010 | Hoang | G06F 21/575 713/189 |
| 2021/0256105 A1* | 8/2021 | Pan | G06F 21/575 |

FOREIGN PATENT DOCUMENTS

| | | | | |
|---|---|---|---|---|
| CN | 106022137 A | * | 10/2016 | ........... G06F 21/575 |
| CN | 109753804 A | | 5/2019 | |

(Continued)

OTHER PUBLICATIONS

Sun, Yu et al. CN 110321715 A (machine translation), Oct. 11, 2019. (Year: 2019).*

(Continued)

*Primary Examiner* — Michael Simitoski
(74) *Attorney, Agent, or Firm* — Wolf, Greenfield & Sacks, P.C.

(57) ABSTRACT

Embodiments of the present application provide a trusted authentication system, method, mainboard, micro board, and a storage medium. According to the solution provided by the embodiments of the present application, when the system is powered on and starts, trusted authentication of a micro board itself is performed on the basis of a first trusted platform control module TPCM on the micro board and, after the authentication is passed, the other components in the micro board are controlled to leave a reset state and trusted authentication of the mainboard is performed by (Continued)

means of a mainboard authentication component used for performing trusted authentication of the mainboard.

27 Claims, 4 Drawing Sheets

(56) References Cited

FOREIGN PATENT DOCUMENTS

| CN | 110119623 A | * | 8/2019 | ............. G06F 21/57 |
| --- | --- | --- | --- | --- |
| CN | 110119638 A | * | 8/2019 | |
| CN | 110321715 A | * | 10/2019 | ........... G06F 21/575 |
| CN | 111008379 A | | 4/2020 | |
| CN | 111625831 A | | 9/2020 | |
| CN | 114428958 A | * | 5/2022 | |

OTHER PUBLICATIONS

W. Yu, Y. Zhang, H. Xu, J. Huang, C. Gan and W. Lu, "High Performance PCIe Interface for the TPCM Based on Linux Platform," 2015 8th International Symposium on Computational Intelligence and Design (ISCID), Hangzhou, China, 2015, pp. 422-425, doi: 10.1109/ISCID.2015.137. (Year: 2015).*

Yao, Jiewen, and Vincent Zimmer. "Building secure firmware." Apress: New York, NY, USA (2020): 197-255. (Year: 2020).*

Wang, Yu-Bo et al. CN 110119638 A (machine translation), Aug. 13, 2019. (Year: 2019).*

Yang, Qing. CN 114428958 A (machine translation), May 3, 2022. (Year: 2022).*

Hao, Zhuang-yan. CN 106022137 A (machine translation), Oct. 12, 2016. (Year: 2016).*

Sun, Yu et al. CN 110119623 A (machine translation), Aug. 13, 2019. (Year: 2019).*

Yang, Tao. CN 111008379 A (machine translation), Apr. 14, 2020. (Year: 2020).*

Chinese Office Action dated Sep. 20, 2024, in connection with Chinese Application No. 202010982939.8, with English translation thereof.

International Search Report mailed Dec. 8, 2021, in connection with International Application No. PCT/CN2021/117387.

Chinese Office Action dated Feb. 28, 2025, in connection with Chinese Application No. 202010982939.8, with English translation thereof.

* cited by examiner

TRUSTED AUTHENTICATION SYSTEM, METHOD, MAINBOARD, MICRO BOARD, AND STORAGE MEDIUM The present application is a national stage filing under 35 U.S.C. 371 of International Patent Application Serial No. PCT/CN2021/117387, filed Sep. 9, 2021, entitled "TRUSTED VERIFICATION SYSTEM AND METHOD, MOTHERBOARD, MICRO-BOARD CARD, AND STORAGE MEDIUM" which claims priority of Chinese Patent Application No. 202010982939.8, filed on Sep. 16, 2020 and entitled "TRUSTED AUTHENTICATION SYSTEM, METHOD, MAINBOARD, MICRO BOARD, AND STORAGE MEDIUM", The entire contents of these applications are incorporated herein by reference in their entirety.

TECHNICAL FIELD

Embodiments in the present application relate to computer technology, and in particular to a trusted authentication system, method, mainboard, micro board, and a storage medium.

BACKGROUND

With the rising demands of information security, it is already necessary to perform trusted authentication of relevant information in the device when the device starts. The basic architecture of the current device is shown in FIG. 1A. When starting, the Trusted Platform Control Module (TPCM) on the mainboard is first powered on and works, and the Trusted Platform Control Module performs trusted authentication of each firmware on the mainboard, while the Peripheral Component Interconnect Express (PCIE) is not yet powered on and do not work. In this way, when the device starts, there are still some firmware (e.g., each firmware in the PCIE) on which the trusted authentication is not performed.

For this reason, a more comprehensive trusted authentication scheme when the device starts is needed.

SUMMARY

In view of this, embodiments of the present application provide a trusted authentication system, method, mainboard, micro board, and a storage medium, to at least partially solve the above-described problems.

In the first aspect, an embodiment of the present application provides a trusted authentication system. The trusted authentication system includes: a mainboard and a micro board; herein the micro board is connected to the mainboard and includes a first Trusted Platform Control Module TPCM; when the system is powered on and starts, the first TPCM performs trusted authentication of the micro board; and after the trusted authentication of the micro board is passed, the first TPCM controls other components on the system to leave a reset state, and performs trusted authentication of the mainboard through a mainboard authentication component used for performing the trusted authentication of the mainboard.

In a second aspect of an embodiment of the present application, a mainboard for trusted authentication is provided. The mainboard includes a Complex Programmable Logic Device CPLD and a second Trusted Platform Control Module TPCM; the CPLD receives a controlling signal from a micro board that has passed trusted authentication and the CPLD controls the second TPMC to leave a reset state; and the second TPCM performs trusted authentication of the mainboard.

In a third aspect of an embodiment of the present application, a micro board for trusted authentication is provided. The micro board is connected to a mainboard and the micro board includes a first Trusted Platform Control Module TPCM; when a device is powered on and starts, the first TPCM performs trusted authentication of the micro board; after the trusted authentication of the micro board is passed, the first TPCM controls other components to leave a reset state, and performs trusted authentication of the mainboard through a mainboard authentication component; wherein the mainboard authentication component is used for performing the trusted authentication of the mainboard.

In a fourth aspect of an embodiment of the present application, a server is provided. The server includes the mainboard in the second aspect.

In a fifth aspect of an embodiment of the present application, a trusted authentication method is provided. The method is applied to a system, the system contains a mainboard and a micro board, and the method includes: when the system is powered on and starts, performing trusted authentication of the micro board, controlling, after the trusted authentication of the micro board is passed, other components on the micro board to leave a reset state, and performing trusted authentication of the mainboard by a mainboard authentication component used for performing the trusted authentication of the mainboard.

In a sixth aspect of an embodiment of the present application, a computer storage medium is provided. The computer storage medium stores a computer program and the computer program, when executed by a processor, implements the trusted authentication method previously described.

According to the solution provided by an embodiment of the present application, when the system is powered on and starts, firstly, the trusted authentication of the micro board itself is performed based on the first Trusted Platform Control Module TPCM on the micro board, and after the authentication is passed, the other components on the micro board is controlled to leave the reset state and work normally. Then, a trusted authentication of the mainboard is performed through the mainboard authentication component in the system, thus realizing a comprehensive trusted authentication of the system when the system starts.

BRIEF DESCRIPTION OF THE DRAWINGS

In order to illustrate more clearly the embodiments of the present application or the technical solutions of related art, those figures to be used in the description of the embodiments or related art are briefly introduced below. It is obvious that the figures described blow are only some embodiments of the ones disclosed in the present application. A person having ordinary skill in the art may obtain other figures according to these figures.

DETAILED DESCRIPTION

In order to enable a person having ordinary skill in the art to better understand the technical solutions in the present application, the technical solutions of the embodiments of the present application will be clearly and comprehensively described below combined with the figures in the embodiments of the present application. It is obvious that the described embodiments are only some of the embodiments of the present application, rather than all of the embodiments. The embodiments based on the embodiments of the present application and all other embodiments obtained by a person having ordinary skill in the art shall fall within the protection scope of the embodiments of the present application.

First of all, the following explanations are applied to some of the terms or expressions that appear in the description of embodiments of the present application:

TPCM: Trusted Platform Control Module. TPCM may store in advance relevant information of the storage device and be used for trusted authentication.

FPGA: Field Programmable Gate Array. It emerged as a semi-custom circuit in the field of application specific integrated circuit (ASIC), with programmable and storable functions.

CPLD: Complex Programmable Logic Device. Users may construct digital integrated circuits with logic functions in CPLD according to their needs. For example, with the help of integrated development software platform, corresponding target files are generated by methods such as schematics and hardware description language, and code is transferred to a target chip to realize the designed digital system.

PCIE: Peripheral Component Interconnect Express. In a conventional device, the PCIE card is connected to mainboard through the specification of PCIE.

Figure 1A:
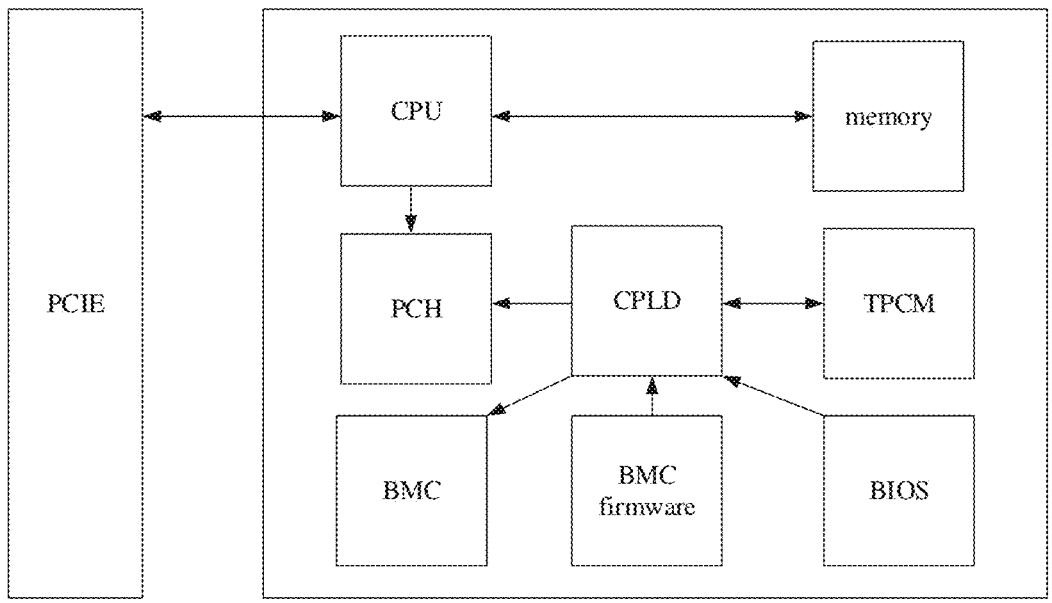
FIG. 1A is a schematic drawing of an architecture related to the present system.

As shown in FIG. 1A, FIG. 1A is a schematic drawing of the architecture related to the present system. Under this circumstance, when the system is powered on, the TPCM on the mainboard will be first powered on and work, while the PCIE card will not be powered on. After the TPCM on the mainboard authenticates the firmware on the mainboard, the system is started, but the firmware in PCIE cannot be authenticated.

Micro board: a physical board device with its own CPU and ROM/RAM, which can run an independent operating system, and can be connected to other hardware through system bus to provide services such as virtualization of input and output IO devices for the hardware, processing and forwarding IO requests. The micro board may also contain programmable components such as CPLD and FPGA. For example, Microserver On Card (MOC) is a kind of micro board.

First TPCM: TPCM on the micro board;
Second TPCM: TPCM on the mainboard.

Based on the foregoing description, the embodiments of the present application provide a trusted authentication system, which implements a more comprehensive trusted authentication when starting. The system includes: a mainboard and a Microserver On Card as micro board; herein, the micro board is connected to the mainboard and includes the first TPCM; when the system is powered on and starts, the first TPCM performs trusted authentication of the micro board; and after the trusted authentication of micro board is passed, the first TPCM controls other components in the system to leave reset state and performs, through the mainboard authentication component used for performing trusted authentication of the mainboard, trusted authentication of the mainboard.

Specifically, the micro board is powered on before the mainboard when the system is powered on and starts. The mainboard (including the components on the mainboard) remains in a reset state until the micro board completes the trusted authentication.

In the process of the trusted authentication of the micro board, the first TPCM on the micro board is the first to start working, and at this time, the other components on the micro board are in the reset state and waiting for the first TPCM to perform trusted authentication of the micro board.

In one implementation, after the trusted authentication of the micro board is passed, the first TPCM may directly control the components on the micro board (including other components on the micro board and a mainboard authentication component) to leave the reset state and perform, through the mainboard authentication component, the trust authentication of the mainboard authentication.

In one implementation, the first TPCM may also indirectly control, through the corresponding control signals, the components on the mainboard (including other components on the mainboard and a mainboard authentication component) to leave the reset state to enable the mainboard authentication component to start performing the trusted authentication of the mainboard.

For example, the first TPCM, after controlling the other components on the micro board to leave the reset state, may then perform, through a programmable component in the other components on the micro board, an enabling operation to the mainboard authentication component on the mainboard, so as to perform the trusted authentication of the mainboard using the mainboard authentication component on the mainboard.

The programmable component in the other components on the micro board may be the CPLD and/or the FPGA configured on the micro board, which may send an enabling signal to the CPLD on the mainboard so that the mainboard authentication component on the mainboard is activated by the CPLD on the mainboard, and the trusted authentication of the mainboard is performed.

The mainboard authentication component performing the trusted authentication of the mainboard may be either a component on the micro board or a component on the mainboard. For example, the first TPCM may send an enabling signal through the programmable component, the CPLD or the FPGA on the micro board to control the CPLD on the mainboard to activate the second TPCM on the mainboard, to enable the second TPCM to perform the trusted authentication of the mainboard. Another example is that the mainboard authentication component performing the trusted authentication of the mainboard may be an FPGA module on the micro board.

Figure 1B:
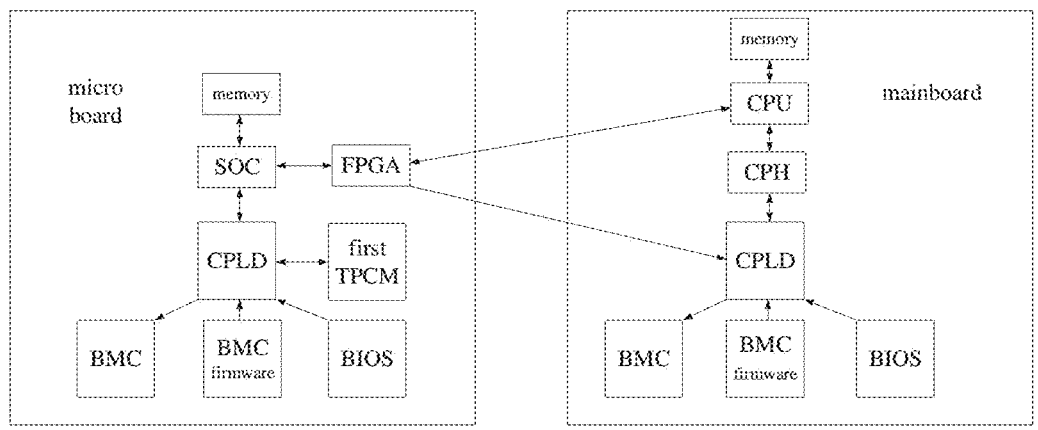
FIG. 1B is a schematic drawing of a trusted authentication system provided by an embodiment of the present application.

As shown in FIG. 1B, FIG. 1B is a schematic drawing of a trusted authentication system provided by the embodiments of the present application. The device involved includes: mainboard; and Microserver On Card as micro board, a first TPCM and a FPGA on the micro board, herein, the FPGA is connected to the mainboard; specifically, the FPGA may be connected to CPU and CPLD on the mainboard via PCIE.

When the system is powered on and starts, the first TPCM performs trusted authentication of the micro board; and after the trusted authentication of micro board is passed, the first TPCM controls other components of the micro board to leave reset state.

The FPGA is used, after the trusted authentication of the micro board is passed, to perform trusted authentication of the mainboard.

In another word, when the system is powered on and starts, the first TPCM on the micro board is powered on first and serves as a component that performs the trusted authentication of the micro board. At this time, the other components on the micro board (including the FPGA) and the components on the mainboard are all in the reset state.

As shown in FIG. 1B, since the firmware on the micro board includes multiple components such as System on Chip (SOC), Basic Input Output System (BIOS), Baseboard Manager Controller (BMC), etc., there may exist some firmware or some system codes in each component, and the trusted authentication of the micro board performed by the first TPCM may include trusted authentication of the firmware or system codes of these components.

Specifically, when the first TPCM is powered on, the first TPCM is first in Serial Peripheral Interface (SPI) master mode, in which the first TPCM may read, based on the SPI master interface, the firmware in the BIOS and the BMC of the micro board, and the first TPCM may perform trusted authentication of the firmware in the BIOS and the BMC.

The first TPCM may pre-store in its register a Root of Trust for Measurement (e.g., a hash value of the firmware obtained in advance by the trusted hardware, or part of pre-stored trusted code in a specified location of the firmware), and the specific authentication way may be: the first TPCM confirms a firmware metric value of the firmware (i.e., the hash value of the firmware or the code in the specified location of the firmware), and matches the firmware metric value with the pre-stored Root of Trust for Measurement, to determine if the firmware metric value is consistent with the pre-stored Root of Trust for Measurement; if the firmware metric value is consistent with the pre-stored Root of Trust for Measurement, then the first TPCM confirms that the firmware is authenticated.

After confirming the firmware in the BIOS and the BMC is trusted, the first TPCM may then send a SOC reset disabling signal and a BMC reset disabling signal, so that the SOC and the BMC leave the reset state and start to work normally, and the SOC starts to load the firmware in the BIOS and the BMC starts to load the firmware in the BMC.

After the SOC and the BMS load the firmware, the first TPCM is switched to SPI slave mode. The first TPCM starts to communicate with SPI master process of the SOC, passively accepts information of the peripheral devices connected to the micro board and preset information of the micro board, and performs trusted authentication of the information of the peripheral devices and the preset information of the micro board. Specifically, the information of the peripheral devices may include but not limited to models, unique identifications, names of the peripheral devices connected to the micro board, and the preset information of the micro board may include but not limited to firmware codes, SOC version of each peripheral device connected to the micro board.

After the trusted authentication of the information of the peripheral devices on the micro board and the preset information of the micro board is passed, the first TPCM may then perform the trusted authentication of the system codes of the SOC. After the trusted authentication of the system codes of the operating system of the SOC is performed, it is indicated that the micro board itself is already authenticated at this time, and the SOC loads the system codes of the SOC to complete the start of the micro board.

The way of performing the trusted authentication of the information of the peripheral devices, the preset information of the micro board, and the system codes of the SOC is similar to the way of performing the trusted authentication of the firmware on the micro board, thus will not be repeated here.

After completing the trusted authentication of the micro board, at this time, the FPGA has been instructed by the first TPCM to leave the reset state and start working normally, and has been acted as a main functional module for implementing the trusted authentication of the mainboard. At this time, the components on the mainboard are still in the reset state.

The mainboard contains components such as the BIOS on the mainboard, the BMC on the mainboard, and the operating system on the mainboard. Specifically, the FPGA performing the trusted authentication of the mainboard may include performing trusted authentication of the BIOS on the mainboard, the BMC on the mainboard, and the operating system on the mainboard.

Specifically, when the trusted authentication of the micro board is completed, and the components on the mainboard are all still in the reset state, the FPGA may obtain the firmware on the mainboard through the SPI master device on the FPGA and perform the trusted authentication of the firmware on the mainboard; herein, the firmware on the mainboard includes the firmware of the Basic Input Output System BIOS of the mainboard, and the firmware of the Baseboard Manager Controller BMC of the mainboard.

The specific authentication way is similar to the aforementioned way of authentication. The FPGA may pre-store a Root of Trust for Measurement (e.g., a hash value of the firmware obtained in advance by the trusted hardware, or part of pre-stored trusted code in a specified location of the firmware). The specific authentication way may be: the first TPCM confirms that a firmware metric value of the firmware on the mainboard (i.e., the hash value of the firmware or the code in the specified location of the firmware), and matches the firmware metric value with the pre-stored Root of Trust for Measurement, to determine if the firmware metric value is consistent with the pre-stored Root of Trust for Measurement; if the firmware metric value is consistent with the pre-stored Root of Trust for Measurement, then the TPCM confirms that the firmware on the mainboard is authenticated.

After the trusted authentication, performed by the FPGA, of the firmware on the mainboard is passed, the FPGA then sends a reset disabling signal of the BMC on the mainboard and a reset disabling signal of the BIOS on the mainboard, and controls the BIOS and the BMC of the mainboard to leave the reset state. Meanwhile, the Platform Controller Hub (PCH, also called as the Integrated Southbridge) of the mainboard loads the firmware in the BIOS of the mainboard, and the BMC of the mainboard loads the firmware in the BMC of the mainboard.

After the firmware in the BIOS and the firmware in the BMC are loaded completely, the FPGA is switched to the Serial Peripheral Interface SPI slave mode, and performs trusted authentication of the information of the peripheral devices on the mainboard and the preset information of the mainboard. The peripheral devices on the mainboard may include model, unique identification, name, etc. of the peripheral devices connected to the mainboard, and the preset information of the mainboard may include firmware codes of each peripheral device connected to the mainboard and the version of the operating system on the mainboard, etc.

Furthermore, after the trusted authentication, performed by the FPGA, of the information of the peripheral devices on the mainboard and the preset information of the mainboard is passed, the FPGA performs the trusted authentication of codes of the operating system on the mainboard. After the authentication is passed, the mainboard loads the codes of the operating system on the mainboard, thus constructing a hardware-trusted environment of the whole system.

In addition, it should be noted that in the aforementioned process of the trusted authentication of the micro board, the implementation of specific order and the delivery of the related reset signal may be realized by programming in CPLD.

Figure 1C:
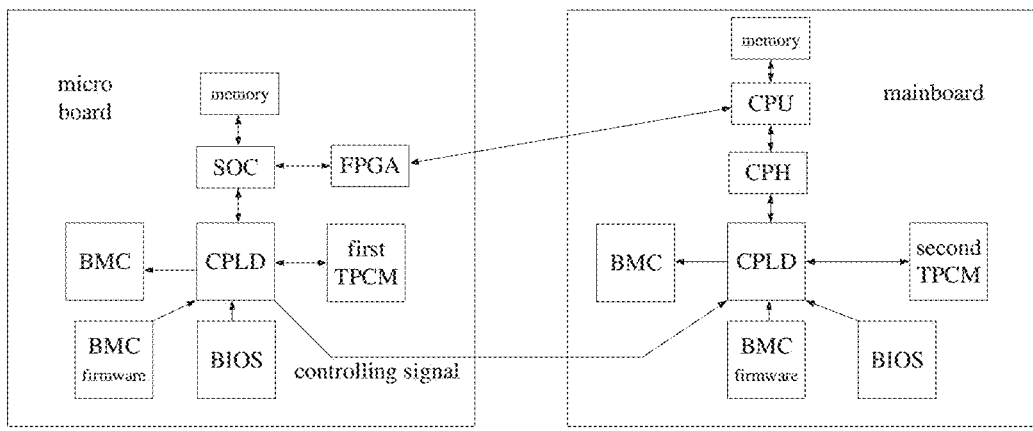
FIG. 1C is a schematic drawing of another trusted authentication system provided by an embodiment of the present application.

In another embodiment, another component performing the trusted authentication of the mainboard may be the second TPCM on the mainboard, as shown in FIG. 1C. FIG. 1C is a schematic drawing of another trusted authentication system provided by an embodiment of the present application. The system includes: a mainboard; and Microserver on Card as micro board; the micro board includes the first Trusted Platform Control Module TPCM, and the mainboard includes a second Trusted Platform Control Module TPCM; when the system is powered on and starts, the first TPCM performs trusted authentication of the micro board; and after the trusted authentication of the micro board is passed, the first TPCM controls the other components on the micro board to leave the reset state, and performs, through a programmable component in the other components that have left the reset state (e.g., CPLD in the micro board), an enabling operation to the mainboard authentication component on the mainboard, so as to perform the trusted authentication of the mainboard through the second TPCM on the mainboard.

The process of performing, by the first TPCM, trusted authentication of micro board has been described in the foregoing portion, and will not be repeated here.

After the trusted authentication, performed by the first TPCM, of the micro board is passed, at this time, the BMC that has left the reset state may generate a mainboard controlling signal. The controlling signal is sent to the mainboard through the programmable component provided on the micro board. The mainboard controls the second TPCM according to the controlling signal to leave the reset state, and the second TPCM performs the trusted authentication of the mainboard.

Specifically, the programmable component on the micro board may be a Complex Programmable Logic Device CPLD or a Field Programmable Gate Array FPGA provided on the micro board.

The Complex Programmable Logic Device CPLD provided on the mainboard may receive the controlling signal in the mainboard. Then, the CPLD on the mainboard controls, according to the controlling signal, the second TPCM to leave the reset state and to start to perform trusted authentication of the mainboard. At this time, the flow of the trusted authentication, performed by the second TPCM of the mainboard is specified as follows:

The second TPCM reads firmware on the mainboard and performs trusted authentication of the firmware on the mainboard. Herein, the firmware on the mainboard includes firmware of the Basic Input Output System BIOS of the mainboard and firmware of the Baseboard Manager Controller BMC of the mainboard. When the calculated firmware metric value is consistent with the value pre-stored in the second TPCM, the authentication is passed.

The second TPCM then sends a controlling signal, such that the BIOS and the BMC of the mainboard are controlled to leave the reset state and start to load the authenticated firmware. Furthermore, the second TPCM is switched to the serial peripheral interface SPI slave mode, communicates with the SPI master of the PCH in the mainboard, and performs trusted authentication of the information of the peripheral devices on the mainboard and the preset information of the mainboard. After the authentication of the information of the peripheral devices and the information of the mainboard is passed, the second TPCM then performs the trusted authentication of codes of the operating system on the mainboard and starts the system after the authentication is passed.

According to the solution provided by an embodiment of the present application, when the system is powered on and starts, firstly, the trusted authentication of the micro board itself is performed based on the first Trusted Platform Control Module TPCM on the micro board, and after the authentication is passed, the other components on the micro board is controlled to leave the reset state and work normally. Then, a trusted authentication of the mainboard is performed through the mainboard authentication component used for performing the trusted authentication of the mainboard, thus realizing a comprehensive trusted authentication of the system when the system starts.

It should be noted that in the aforementioned process of trusted authentication, if trusted authentication of any one component fails, the start process of the system may be interrupted to maintain a secure running environment of the system.

In addition, in an embodiment, in the process of the mainboard normally running after starting, the FPGA on the micro board may also monitor information in a memory of the mainboard to determine whether the content running in the mainboard is authenticated. The information in the memory of the mainboard may include names of the running processes, the number of the processes, space occupied by the processes, interfaces called by the processes, etc.

Furthermore, the FPGA monitoring the information in the memory may include: determining a hash value of the obtained information in the memory; and matching the hash value of the information in the memory with hash values pre-stored in the FPGA.

The pre-stored hash values may be hash values corresponding to names or identifiers of some risk processes that have adverse effects on the security of the data or programs on the mainboard, and are equivalent to a blacklist. Therefore, if there is a hash value, that is same as a pre-stored hash value, related to a certain process in the memory on the mainboard, it can be considered that certain processes having security risk are run on the device where the mainboard is located. Alternatively, the pre-stored hash values may also be hash values corresponding to names or identifiers of confirmed secure processes, and are equivalent to a whitelist. Therefore, if there is a hash value, that is not same as the pre-stored hash values, related to a certain process in the memory on the mainboard, it can be considered that the process is a process having a security risk. Therefore, the corresponding monitoring of the process having the security risk may be implemented; or, the process may be forcibly closed by calling the micro board to realize maintaining of a dynamic secure environment.

In an embodiment, the mainboard in the system may be a server mainboard.

Figure 2:
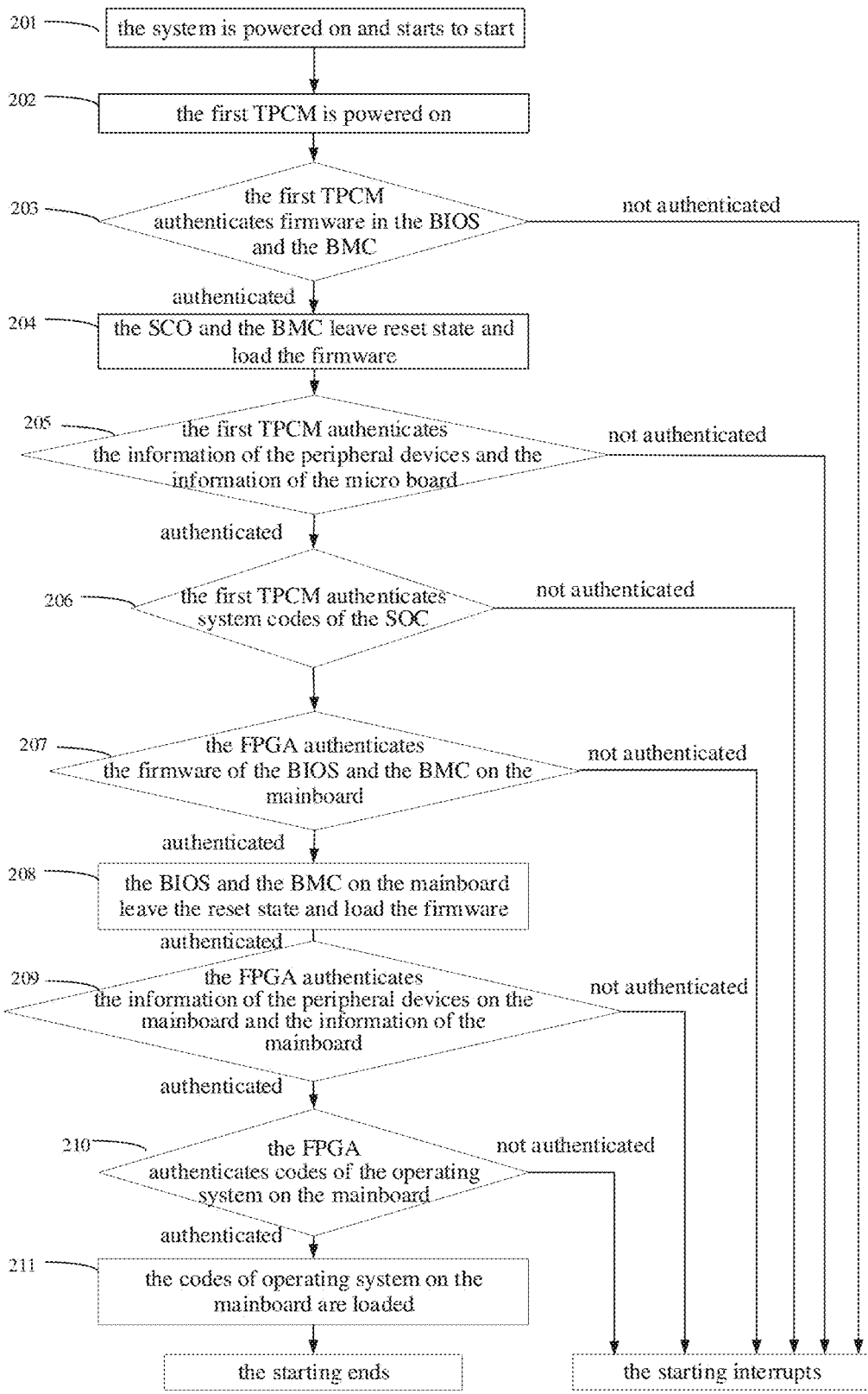
FIG. 2 is a schematic flowchart of a trusted authentication performed by a system provided by an embodiment of the present application.

In order to make the solution of the present application more simple and understandable, a more specific example is given in the following, as shown in FIG. 2. FIG. 2 is a schematic flowchart of a trusted authentication performed by a system provided by an embodiment of the present application. In the schematic drawing, the FPGA module on the micro board of the system is used to perform the trusted authentication of the mainboard. Specifically, the flowchart includes 201-211.

At 201, the system is powered on and starts to start. Herein, the system contains a micro board and a mainboard.

At 202, the first TPCM on the micro board is powered on and works, and the other components are all in the reset state.

At 203, the first TPCM authenticates the firmware in the BIOS and BMC on micro board.

At 204, the authentication is passed, the SOC and BMC on the micro board leave the reset state, and the SOC and BMC on the micro board load the firmware.

At 205, the first TPCM is switched to a slave mode and authenticates the information of peripheral devices of the mainboard and the information of the mainboard.

At 206, the authentication passed, and the first TPCM authenticates system codes of the SOC.

At 207, the authentication passed, and the FPGA on the mainboard authenticates the firmware in the BIOS and the BMC of the mainboard.

At 208, the authentication passed, the BIOS and the BMC on the mainboard leave the reset state, and the BIOS and the BMC on the mainboard load the firmware.

At 209, the FPGA is switched to the slave mode and authenticates the information of the peripheral devices of the mainboard and the information of the mainboard.

At 210, the authentication passed and the FPGA authenticates codes of the operating system on the mainboard.

At 211, the authentication passed, the mainboard loads the codes of the operating system on the mainboard, and the device starts.

In the case where any one of the aforementioned trusted authentications fails, the start process of the system may be interrupted.

After the system starts, the FPGA may also monitor memory information in the mainboard, to realize a dynamic monitoring of the secure environment of the system.

Figure 1D:
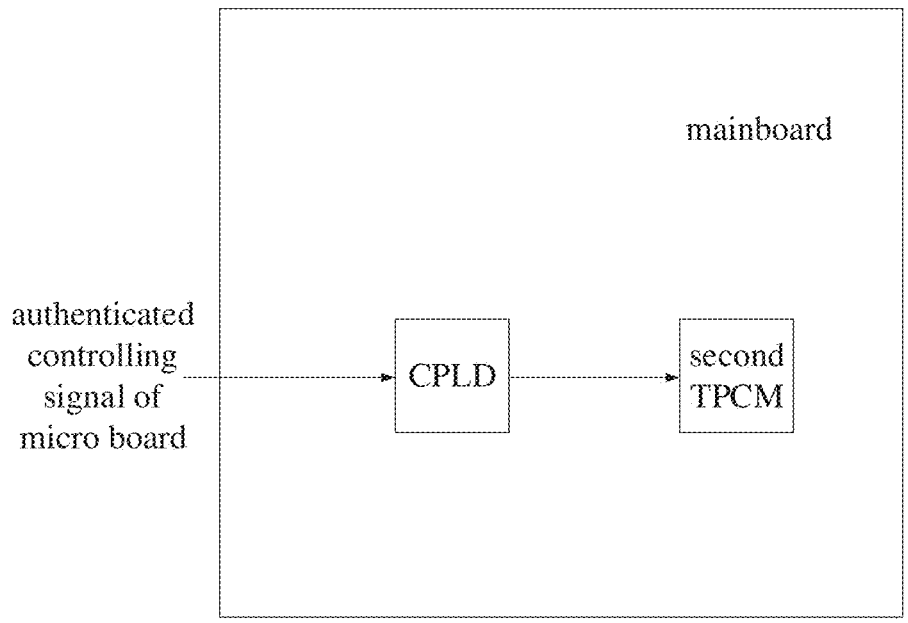
FIG. 1D is a schematic structural drawing of a mainboard for trusted authentication provide by an embodiment of the present application.

In a second aspect of the present application, a trusted authentication mainboard is also provided, as shown in FIG. 1D. FIG. 1D is a schematic structural drawing of a mainboard for trusted authentication provide by an embodiment of the present application. The mainboard includes a Complex Programmable Logic Device CPLD and a second Trusted Platform Control Module TPCM.

The CPLD receives a controlling signal from a micro board that has passed trusted authentication and controls the second TPCM to leave reset state.

The second TPCM performs the trusted authentication of the mainboard.

Figure 1E:
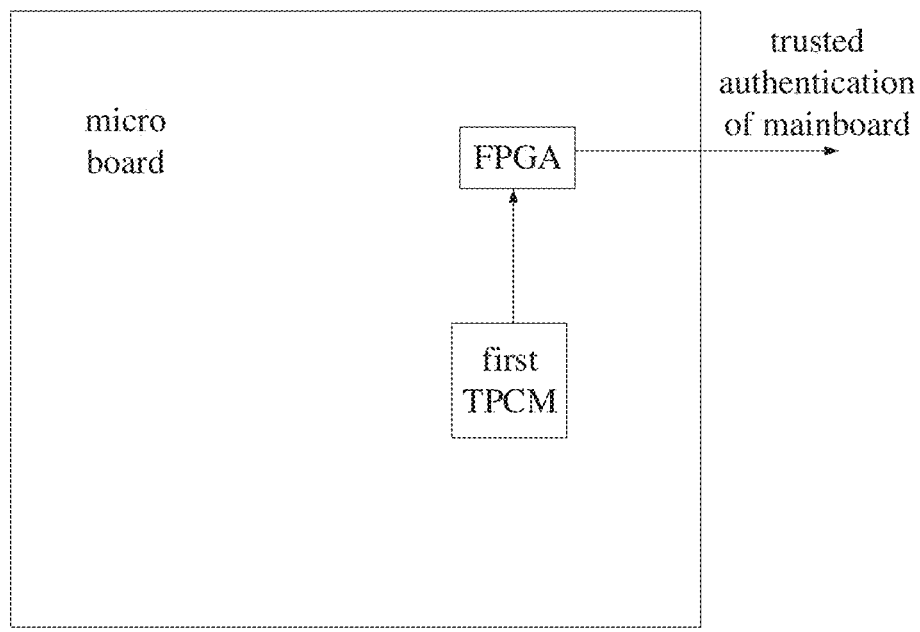
FIG. 1E is a schematic structural drawing of a micro board for trusted authentication provided by an embodiment of the present application.

In a third aspect of the present application, a micro board for trusted authentication is also provided, as shown in FIG. 1E. FIG. 1E is a schematic structural drawing of a micro board for trusted authentication provided by an embodiment of the present application. The micro board is connected to the mainboard (not shown in the figure). The micro board includes first Trusted Platform Control Module TPCM.

When the device is powered on and starts, the first TPCM performs the trusted authentication of the micro board; and after the trusted authentication of the micro board is passed, the first TPCM controls other components to leave the reset state and performs trusted authentication of the mainboard through the mainboard authentication component used for performing trusted authentication of the mainboard.

Herein, the mainboard authentication component includes the Field Programmable Gate Array FPGA provided on the micro board and/or the Complex Programmable Logic Device CPLD provided on the micro board.

In a fourth aspect of an embodiment of the present application, a server is also provided. The server includes the mainboard for trusted authentication in the second aspect.

Further, the server also includes the micro board for trusted authentication in the third aspect.

Figure 3:
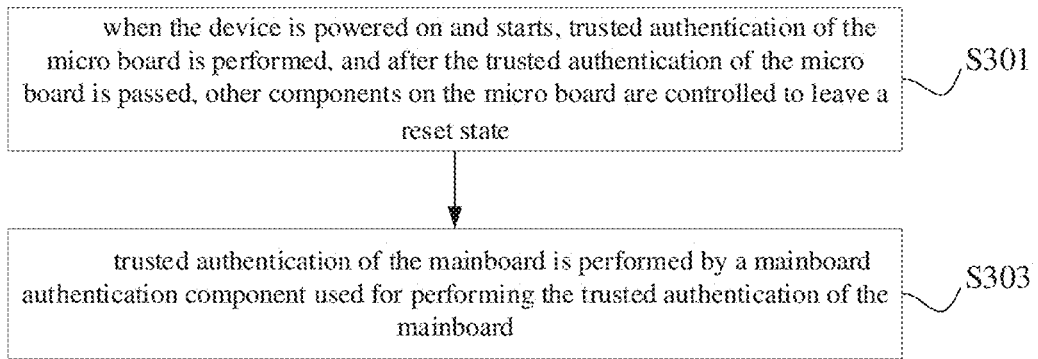
FIG. 3 is a schematic flowchart of a trusted authentication method provided by an embodiment of the present application.

In a fifth aspect of an embodiment of the present application, a trusted authentication method is also provided. The method is applied to a system, and the system contains a mainboard and a micro board, as shown in FIG. 3. FIG. 3 is a schematic flowchart of a trusted authentication method provided by an embodiment of the present application. Specifically, the method includes S301 and S303.

At S301, when the system is powered on and starts, trusted authentication of the micro board is performed, and after the trusted authentication of the micro board is passed, other components on the micro board are controlled to leave a reset state.

At S303, trusted authentication of the mainboard is performed by a mainboard authentication component used for performing the trusted authentication of the mainboard. Optionally, performing the trusted authentication of the micro board may be: performing the trusted authentication of the micro board by using the first TPCM on the micro board.

Optionally, after the trusted authentication of the micro board is passed, the first TPCM controls the other components and the mainboard authentication component on the micro board to leave the reset state, and the first TPCM performs the trusted authentication of the mainboard through the mainboard authentication component that has left the reset state.

Optionally, the mainboard authentication component on the micro board includes a Field Programmable Gate Array FPGA provided on the micro board; the FPGA is connected to the mainboard; and the micro board performs the trusted authentication of the mainboard through the FPGA.

Optionally, after the trusted authentication of the micro board is passed, the first TPCM controls the other components on the micro board to leave the reset state, and the first TPCM performs, through a programmable component in the other components that has left the reset state, an enabling operation to the mainboard authentication component on the mainboard, to perform the trusted authentication of the mainboard through the mainboard authentication component on the mainboard.

Optionally, the mainboard authentication component on the mainboard includes a second TPCM on the mainboard; and the micro board performs the enabling operation to the mainboard authentication component on the mainboard through the programmable component, to perform the trusted authentication of the mainboard through the second TPCM on the mainboard.

Optionally, the micro board sends, through the programmable component provided on the micro board, a controlling signal to the mainboard; and the mainboard, according to the controlling signal, controls the second TPCM to leave the reset state, and the mainboard performs the trusted authentication of the mainboard through the second TPCM.

Optionally, the programmable component includes: a Complex Programmable Logic Device CPLD and/or a Field Programmable Gate Array FPGA.

Optionally, the micro board further includes: a Basic Input Output System BIOS and a Baseboard Manager Controller BMC; and performing the trusted authentication of the micro board, includes: performing trusted authentication of the firmware; herein, the firmware includes: firmware in the Basic Input Output System BIOS of the micro board and firmware in the BMC of the micro board.

Optionally, performing the trusted authentication of the firmware, including: confirming a hash value of the firmware, matching the hash value of the firmware with a pre-stored hash value, to determine if the hash value of the firmware is consistent with the pre-stored hash value, and if the hash value of the firmware is consistent with the pre-stored hash value, confirming that the firmware is authenticated.

Optionally, after the trusted authentication of the firmware is passed, the SOC and the BMC are controlled to leave the reset state; and accordingly, the SOC loads the firmware in the BIOS and the BMC loads the firmware in the BMC.

Optionally, performing the trusted authentication of the micro board, including: the first TPCM being switched to a Serial Peripheral Interface SPI slave mode, and performing trusted authentication of information of a peripheral device on the micro board and pre-stored information of the micro board.

Optionally, after the trusted authentication of the information of the peripheral device on the micro board and the pre-stored information of the micro board is passed, trusted authentication of system codes of the SOC is performed, and after the authentication of the system codes of the SOC is passed, the SOC loads the system codes of the SOC.

Optionally, performing the trusted authentication of the mainboard, includes: obtaining firmware on the mainboard and performing trusted authentication of the firmware on the mainboard; wherein the firmware on the mainboard includes firmware of a Basic Input Output System BIOS of the mainboard and firmware of a Baseboard Manager Controller BMC of the mainboard.

Optionally, after the trusted authentication of the mainboard is passed, controlling the mainboard to leave the reset mode, includes: after the trusted authentication of the firmware on the mainboard is passed, controlling the BIOS and the BMC of the mainboard to leave the reset state; herein, a Platform Controller Hub PCH of the mainboard loads the firmware in the BIOS of the mainboard, and the BMC of the mainboard loads the firmware of the BMC of the mainboard.

Optionally, performing the trusted authentication of the mainboard, includes: performing trusted authentication of information of a peripheral device on the mainboard and preset information of the mainboard.

Optionally, after the trusted authentication of the information of the peripheral device on the mainboard and the preset information of the mainboard is passed, trusted authentication of codes of an operating system on the mainboard is performed; and after the authentication is passed, the mainboard loads the codes of the operating system on the mainboard.

Optionally, information in a memory of the mainboard is obtained and the information in the memory is monitored.

Optionally, monitoring the information in the memory, includes: determining a hash value of a code of the obtained information in the memory; and matching the hash value of the code of the information in the memory with a pre-stored hash value.

Optionally, when the system is powered on and starts, the micro board is powered on and starts earlier than the mainboard, and the mainboard remains in the reset state before the trusted authentication of the micro board is passed; and accordingly, after the trusted authentication of the micro board is passed, the micro board controls the mainboard to leave the reset state.

Optionally, the mainboard is a server mainboard.

According to the solution provided by an embodiment of the present application, when the system is powered on and starts, firstly, the trusted authentication of the micro board itself is performed based on the first Trusted Platform Control Module TPCM on the micro board, and after the authentication is passed, the other components on the micro board is controlled to leave the reset state and work normally. Then, a trusted authentication of the mainboard is performed through the mainboard authentication component used for performing the trusted authentication of the mainboard, thus realizing a comprehensive trusted authentication of the system when the system starts.

In a sixth aspect of an embodiment of the present application, a computer storage medium is also provided. The computer storage medium stores a computer program, and the computer program, when executed by a processor, implements the trusted authentication method shown in FIG. 3.

It should be noted that, according to needs of the implementation, each component/step described in the embodiment of the present application may be split into more components/steps, and two or more components/steps or parts of operations of the components/steps may also be combined into a new component/step, in order to achieve the objective of the embodiment of the present application.

The above method according to the embodiment of the present application may be implemented in hardware or firmware, or may be implemented as software or computer codes that may be stored in a recording medium (such as a CD ROM, an RAM, a floppy disk, a hard disk, or a magneto-optical disk), or may be implemented as computer codes that are downloaded through the network, originally stored in a remote recording medium or a non-temporary machine-readable medium, and will be stored in a local recording medium. Therefore, the method described herein may be processed by software stored on a recording medium using a general-purpose computer, a special-purpose processor, or programmable or special-purpose hardware (such as the ASIC or the FPGA). It can be understood that computers, processors, microprocessor controllers, and programmable hardware include the storage components (e.g. the RAM, the ROM, the flash memory) that may store or receive computer codes. The software or the computer codes, when accessed and executed by a computer, a processor or hardware, inplement the described trusted authentication method. In addition, when a general-purpose computer accesses codes used for implementing the trusted authentication method shown herein, the execution of the codes converts the general-purpose computer into a special-purpose computer for performing the trusted authentication method shown herein.

A person having ordinary skill in the art may realize that units and method steps of each example described in combination with the embodiments disclosed herein can be realized by electronic hardware, or the combination of computer software and the electronic hardware. Whether these functions are implemented with hardware or software depends on design constraints and specified applications of technical solutions. For each specified application, professionals may use different methods to implement the described functions, while those implementations shall not be considered as beyond the scope of embodiments of the present application.

The above implementations are only used to illustrate embodiments of the present application, not to limit the embodiments of the present application. A person having ordinary skill in the related technical art may also make various changes and variations without departing from the spirit and scope of the embodiments of the present application. Therefore, all equivalent technical solutions also belong to the scope of the embodiments of the present application, and the patent protection scope of the embodiments of the present application should be limited by the claims.

What is claimed is:

1. A trusted authentication system, comprising:
   a mainboard; and
   a micro board; wherein the micro board is connected to the mainboard and the micro board comprises a first Trusted Platform Control Module TPCM;
   when the system is powered on and starts, the first TPCM performs trusted authentication of the micro board; and after the trusted authentication of the micro board is passed, the first TPCM controls other components on the micro board to leave a reset state, and performs trusted authentication of the mainboard through a mainboard authentication component; wherein the mainboard authentication component is used for performing the trusted authentication of the mainboard,
   wherein after the trusted authentication of the micro board is passed, the first TPCM controls the other components on the micro board to leave the reset state, and the first TPCM performs, through a programmable component in the other components that has left the reset state, an enabling operation to the mainboard authentication component on the mainboard, to perform the trusted authentication of the mainboard through the mainboard authentication component on the mainboard.

2. The system of claim 1, wherein after the trusted authentication of the micro board is passed, the first TPCM controls the other components and the mainboard authentication component on the micro board to leave the reset state, and the first TPCM performs the trusted authentication of the mainboard through the mainboard authentication component that has left the reset state.

3. The system of claim 2, wherein the mainboard authentication component on the micro board comprises a Field Programmable Gate Array FPGA provided on the micro board; the FPGA is connected to the mainboard; and
   the micro board performs the trusted authentication of the mainboard through the FPGA.

4. The system of claim 3, wherein the micro board performing the trusted authentication of the mainboard through the FPGA, comprises:
   the FPGA obtaining firmware on the mainboard and performing trusted authentication of the firmware on the mainboard; wherein the firmware on the mainboard comprises firmware of a Basic Input Output System BIOS of the mainboard and firmware of a Baseboard Manager Controller BMC of the mainboard.

5. The system of claim 4, wherein the FPGA is further used for controlling, after the trusted authentication of the firmware on the mainboard is passed, the BIOS and BMC of the mainboard to leave the reset state; and
   accordingly, a Platform Controller Hub PCH of the mainboard loads the firmware in the BIOS of the mainboard, and the BMC of the mainboard loads the firmware of the BMC of the mainboard.

6. The system of claim 5, wherein the micro board performing the trusted authentication of the mainboard through the FPGA, comprises:
   the FPGA being switched to a Serial Peripheral Interface SPI slave mode and performing trusted authentication of information of a peripheral device on the mainboard and preset information of the mainboard.

7. The system of claim 6, wherein the micro board performing the trusted authentication of the mainboard through the FPGA, comprises:
   after the trusted authentication of the information of the peripheral device on the mainboard and the preset information of the mainboard is passed, the FPGA performing trusted authentication of codes of an operating system on the mainboard.

8. The system of claim 3, wherein the FPGA is further used for obtaining information in a memory of the mainboard and monitoring the information in the memory.

9. The system of claim 8, wherein monitoring the information in the memory comprises:
   determining a hash value of the obtained information in the memory; and
   matching the hash value of the information in the memory with a hash value pre-stored in the FPGA.

10. The system of claim 1, wherein the mainboard authentication component on the mainboard comprises a second TPCM on the mainboard; and
    the micro board performs the enabling operation to the mainboard authentication component on the mainboard through the programmable component, to perform the trusted authentication of the mainboard through the second TPCM on the mainboard.

11. The system of claim 10, wherein the micro board sends, through the programmable component provided on the micro board, a controlling signal to the mainboard; and
    the mainboard, according to the controlling signal, controls the second TPCM to leave the reset state, and the mainboard performs the trusted authentication of the mainboard through the second TPCM.

12. The system of claim 10, wherein the micro board performing the enabling operation to the mainboard authentication component on the mainboard through the programmable component, to perform the trusted authentication of the mainboard through the second TPCM on the mainboard, comprises:
    the second TPCM reading firmware on the mainboard and performing trusted authentication of the firmware on the mainboard; wherein the firmware on the mainboard comprises firmware of a Basic Input Output System BIOS of the mainboard and firmware of a Baseboard Manager Controller BMC of the mainboard.

13. The system of claim 12, wherein the second TPCM is further used for controlling, after the trusted authentication of the firmware on the mainboard is passed, the BIOS and the BMC of the mainboard to leave the reset state.

14. The system of claim 12, wherein the micro board performing the enabling operation to the mainboard authentication component on the mainboard through the programmable component, to perform the trusted authentication of the mainboard through the second TPCM on the mainboard, further comprises:

the second TPCM being switched to a Serial Peripheral Interface SPI slave mode and performing trusted authentication of information of a peripheral device on the mainboard and preset information of the mainboard.

15. The system of claim 14, wherein the micro board performing the enabling operation to the mainboard authentication component on the mainboard through the programmable component, to perform the trusted authentication of the mainboard through the second TPCM on the mainboard, further comprises:

after the trusted authentication of the information of the peripheral device on the mainboard and the preset information of the mainboard is passed, the second TPCM performing trusted authentication of codes of an operating system on the mainboard.

16. The system of claim 1, wherein the programmable component comprises: a Complex Programmable Logic Device CPLD and/or a Field Programmable Gate Array FPGA.

17. The system of claim 1, wherein the micro board further comprises: a Basic Input Output System BIOS and a Baseboard Manager Controller BMC; and the first TPCM performing the trusted authentication of the micro board, comprises: the first TPCM reading firmware and performing trusted authentication of the firmware; wherein the firmware comprises: firmware in the Basic Input Output System BIOS of the micro board and firmware in the BMC of the micro board.

18. The system of claim 17, wherein the first TPCM reading the firmware and performing the trusted authentication of the firmware, comprises:

the first TPCM reading the firmware, confirming a hash value of the firmware, matching the hash value of the firmware with a hash value pre-stored in the first TPCM, to determine if the hash value of the firmware is consistent with the hash value pre-stored in the first TPCM, and if the hash value of the firmware is consistent with the hash value pre-stored in the first TPCM, confirming that the firmware is authenticated.

19. The system of claim 17, wherein the micro board further comprises a System on Chip SOC;

after the trusted authentication of the firmware is passed, the first TPCM controls the SOC and the BMC to leave the reset state; and accordingly, the SOC loads the firmware in the BIOS and the BMC loads the firmware in the BMC.

20. The system of claim 19, wherein the first TPCM performing the trusted authentication of the micro board, comprises:

the first TPCM being switched to a Serial Peripheral Interface SPI slave mode, and performing trusted authentication of information of a peripheral device on the micro board and pre-stored information of the micro board.

21. The system of claim 20, wherein, after the trusted authentication of the information of the peripheral device on the micro board and the pre-stored information of the micro board is passed, the first TPCM performs trusted authentication of system codes of the SOC, and after the authentication of the system codes of the SOC is passed, the SOC loads the system codes of the SOC.

22. The system of claim 1, wherein when the system is powered on and starts, the micro board is powered on and starts earlier than the mainboard, and the mainboard remains in the reset state before the trusted authentication of the micro board is passed; and accordingly, after the trusted authentication of the micro board is passed, the micro board controls the mainboard to leave the reset state.

23. A mainboard for trusted authentication, wherein the mainboard comprises: a Complex Programmable Logic Device CPLD and a second Trusted Platform Control Module TPCM;

the CPLD receives a controlling signal from a micro board that has passed trusted authentication and the CPLD controls the second TPCM to leave a reset state; and the second TPCM performs trusted authentication of the mainboard.

24. A micro board for trusted authentication, wherein the micro board is connected to a mainboard and the micro board comprises a first Trusted Platform Control Module TPCM;

when a device is powered on and starts, the first TPCM performs trusted authentication of the micro board; after the trusted authentication of the micro board is passed, the first TPCM controls other components to leave a reset state, and performs trusted authentication of the mainboard through a mainboard authentication component; wherein the mainboard authentication component is used for performing the trusted authentication of the mainboard, wherein after the trusted authentication of the micro board is passed, the first TPCM controls the other components on the micro board to leave the reset state, and the first TPCM performs, through a programmable component in the other components that has left the reset state, an enabling operation to the mainboard authentication component on the mainboard, to perform the trusted authentication of the mainboard through the mainboard authentication component on the mainboard.

25. The micro board of claim 24, wherein the mainboard authentication component comprises a Field Programmable Gate Array FPGA and/or a Complex Programmable Logic Device CPLD.

26. A trusted authentication method, wherein the method is applied to a system of claim 1, the system comprises a mainboard and a micro board, and the method comprises:

when the system is powered on and starts, performing trusted authentication of the micro board, controlling, after the trusted authentication of the micro board is passed, other components on the micro board to leave a reset state, and performing trusted authentication of the mainboard through a mainboard authentication component; wherein the mainboard authentication component is used for performing the trusted authentication of the mainboard.

27. A non-transitory computer storage medium, wherein the non-transitory computer storage medium stores a computer program and the computer program, when executed by a processor, implements the trusted authentication method of claim 26.

* * * * *